United States Patent

Soderberg et al.

Patent Number: 5,493,643
Date of Patent: Feb. 20, 1996

[54] IMAGE GENERATOR ARCHITECTURE EMPLOYING TRI-LEVEL FIXED INTERLEAVE PROCESSING AND DISTRIBUTION BUSES

[75] Inventors: Brian T. Soderberg, Woodinville; Dale D. Miller, Seattle; Douglas Pheil, Redmond; Kent Cauble, Renton; Mark N. Heinen, Issaquah; Mark L. Kenworthy, Duvall, all of Wash.

[73] Assignee: Loral Aerospace Corp., New York, N.Y.

[21] Appl. No.: 237,286

[22] Filed: May 3, 1994

[51] Int. Cl.$^6$ .................................................. G06F 15/00
[52] U.S. Cl. .................................................. 395/162
[58] Field of Search .............................. 395/162, 163, 395/164, 200, 250, 375, 425, 800; 364/228.3, 229.2, 240.1, 240.2, 578, 933.8

[56] References Cited

U.S. PATENT DOCUMENTS

| | | | |
|---|---|---|---|
| 5,293,480 | 3/1994 | Miller et al. | 395/163 |
| 5,317,689 | 5/1994 | Nack et al. | 395/163 |
| 5,371,896 | 12/1994 | Gore et al. | 395/800 |
| 5,394,524 | 2/1995 | DiNicola et al. | 395/163 |

*Primary Examiner*—Mark R. Powell
*Assistant Examiner*—U. Chauhan
*Attorney, Agent, or Firm*—Kenneth W. Float; Anthony W. Karambelas

[57] ABSTRACT

An image generator architecture in which tri-level fixed interleave processing provides medium grain parallelism for polygon, tiling, and pixel operations. Input data at each stage are divided into spatially distributed subsets that are interleaved among parallel processors using a fixed, precalculated mapping that minimizes correlation of local scene complexity with any one processor. The present tri-level fixed interleave processing architecture divides a processing task into a pseudo-random, fixed interleaved pattern of regions that are assigned to different processors. Each processor processes many of these randomly located regions. The assignment of processors to regions is a fixed repeating pattern. The highest level of fixed interleave processing is the allocation of fixed-size database regions (area modules) to polygon processors. The next level relates to image sub-region fixed interleave processing. At this level, the displayed image is divided into small sub-regions that are assigned to tilers in a pseudo-random, but fixed manner. This levels the load across all pixel processors. Typically, tilers process a large contiguous area of the image. The present invention uses small sub-regions (64×64 pixels) and assigns many sub-regions from different channels to a single tiler. Each tiler maintains equal loading even with localized regions of high pixel processing. The third level relates to two-by-two pixel, fixed interleave processing. The image is further divided into 2×2 pixel blocks spread across multiple pixel operators on a tiler. This fine grain parallelism, in a fixed pseudo-random orientation, ensures equal loading across all pixel processors. The second aspect of the present invention is the use of polygon and pixel distribution buses. Maximum image generator configurability, expansion, and efficient processing is required for a variety of simulator configurations used in networked training environments. To accomplish this, distribution buses are implemented between all graphics processing stages.

4 Claims, 6 Drawing Sheets

IMAGE GENERATOR ARCHITECTURE EMPLOYING TRI-LEVEL FIXED INTERLEAVE PROCESSING AND DISTRIBUTION BUSES

BACKGROUND

The present invention relates to image generation architectures, and more particularly, to an image generator architecture employing tri-level fixed interleave processing and distribution buses for use in image generation.

One problem relating to image generation is that visual systems substantially suffer in processing efficiency across all computational resources as a function of irregular and changing spatial distribution of the complexity of an image scene. Thus there is a need for an image generation architecture that maintains high processing efficiency that is independent of the spatial distribution of the image scene.

One primary architectural goal is to evenly distribute the computational load among processing resources. Pipeline approaches have been constrained to associate processing resources with display regions or channels. When image complexity becomes localized, some computational resources become overloaded while others are idle. Given the unpredictable nature of scene content in image generation, for example, scene complexity is frequently restricted to a localized viewport region or channel. Use of a pipeline architecture results in visual anomalies that are intrusive to training processes, for example.

A second problem relating to image generation is that visual systems cannot be configured to match specific polygon and pixel processing requirements for all applications. To solve this problem, the visual system should be reconfigurable through modularity, scalability, and real-time allocation of processing resources across channels. If a given application needs more polygon capacity, less pixel capacity, and more channel capacity than a nominal configuration, such needs should be achieved by independently adjusting the polygon, pixel, and video generation resources accordingly. With a fixed pipeline architecture in which the output of each stage feeds directly into the next, tuning the ratios among polygon, pixel, and display capacities is impossible.

Generating real-time images of a dynamic battlefield environment, for example, static allocation of processing resources on a per-channel basis yields overload on some channels while resources associated with other channels are underutilized. Traditionally, architectures have been designed so that computational resources are statically assigned to display channels. Such an approach works well for a three-channel configuration. Here, the polygon loading due to moving vehicles is uniform across the three channels, and each channel is at its maximum polygon capacity.

However, given the unpredictable motion of vehicles in a dynamic battlefield environment, such uniform loading of polygons among channels is unlikely. If the same scene is viewed from a different vantage point, all the polygons from the moving models are concentrated in the center channel.

A third problem relating to image generation is that visual systems cannot be configured to support a ratio of polygon performance relative to pixel performance of at least six polygons per thousand pixels. A review of the historical polygon and pixel performance requirements growth of a distributed interactive tactical team trainer manufactured by the assignee of the present invention, while the polygon and pixel performance requirements have grown, the ratio of polygon to pixel performance has remained within a narrow region of about 2 to 6 polygons per thousand pixels. Requirements for the next generation of distributed tactical team trainers have remained within these bounds.

Visual systems optimized for air vehicles have not been balanced for this required range of polygon to pixel performance ratio, typically providing a relatively large number of pixels compared to polygons. The ratios lie within a range of about 0.4 to 1.5 polygons per thousand pixels. This low ratio of polygons to pixels is correct for air vehicle simulators because three-dimensional complexity and depth complexity are very low when the real-world is simulated for higher altitudes.

Because an image generator's architecture determine the optimal operating range of polygons to pixels, for a machine to be optimized for a wide range of image generation applications, it must be designed to achieve this from the start. In addition, such a system should be modular and scalable to allow each image generator to be configured for precise polygon and pixel loading requirements of the trainer coupled to it.

Therefore, it is an objective of the present invention to provide for an image generator architecture for use in image generation systems such as training simulators, and the like, that overcomes the above-mentioned problems.

SUMMARY OF THE INVENTION

In order to meet the above and other objectives, the present invention is an image generator architecture in which tri-level fixed interleave processing provides medium grain parallelism for polygon, tiling, and pixel operations. Input data at each stage are divided into spatially distributed subsets that are interleaved among parallel processors using a fixed, precalculated mapping that minimizes correlation of local scene complexity with any one processor. Thus image generator loading is leveled implicitly, without active real-time intervention.

The present invention uses a shared memory multiprocessor approach. During a computation frame, as a processor completes processing of its assigned database region, it checks the loading of neighboring processors that are assigned to other channels. It then offloads processing from other busy processors. Thus, full system processing capabilities are utilized, meeting any situation in which some channels are overloaded. However, the average channel loading is within system capacity.

More specifically, the present invention includes tri-level fixed interleave processing and a distribution bus architecture. The value in these inventions comes in their combined application to the task of image generation. The tri-level fixed interleave processing aspect of the present invention levels the loading across all database, polygon, and pixel processors.

In networked training systems, for example, visual system processing requirements are such that millions of polygons and hundreds of millions of pixels are processed every second. This enormous processing load requires many resources working in parallel on polygon and pixel calculations. The challenge in this graphics environment is to provide a technique that levels the loading of many parallel processing resources. Without load leveling, each resource must be designed to handle the worst case, driving system costs excessively high.

The present tri-level fixed interleave processing architecture divides a processing task into a pseudo-random, fixed interleaved pattern of regions that are assigned to different processors. Each processor processes many of these randomly located regions. The assignment of processors to regions is a fixed repeating pattern.

The highest level of fixed interleave processing is the allocation of fixed-size database regions (area modules) to polygon processors. This solves two problems. The first is parsing out of polygon processing to parallel processors, and the second is allowing a specific database region to be processed in a single processor, even when required across multiple channels. This alleviates the need for additional memory and processing resources when a region must be processed for multiple channels.

The next level relates to image sub-region fixed interleave processing. At this level, the displayed image is divided into small sub-regions that are assigned to tilers in a pseudo-random, but fixed manner. This levels the load across all pixel processors. Typically, conventional tilers process a large contiguous area of the image. This technique suffers an overload when all processing fall into one pixel processors region of the image. The present invention solves this problem by using small sub-regions (commonly 64×64 pixels) and assigning many sub-regions from different channels to a single tiler. Each tiler maintains equal loading even with localized regions of high pixel processing.

The third level relates to two-by-two pixel, fixed interleave processing. The third level of fixed interleaving is at the lowest pixel processing level in the architecture. The image is further divided into 2×2 pixel blocks spread across multiple pixel operators on a tiler. This fine grain parallelism, in a fixed pseudo-random orientation, ensures equal loading across all pixel processing resources. The present tri-level fixed interleaved architecture thus equalizes loading across all processors under all conditions, providing consistent maximum system performance required for the multi-channel training in complex battlefield environments.

The second aspect of the present invention is the use of polygon and pixel distribution buses. Maximum image generator configurability, expansion, and efficient processing is required for a variety of simulator configurations used in networked training environments. To accomplish this, distribution buses are implemented between all graphics processing stages.

A variety of polygon and pixel processing capacities are necessary for channels of each simulation module. In some cases, high pixel processing capacities are required for high resolution views. In other cases, high polygon processing capacities are required for wide fields of view. In some cases, polygon processing demands change dynamically from frame to frame across several channels. These variations in processing allocation and dynamic processing requirements are addressed by the present architecture.

Most graphics systems have rigid pipelined architectures. The database engine feeds the polygon processor, which feeds the pixel processor and finally the video processor. The entire graphics pipeline is then duplicated to provide the required processing levels. The major drawback in this architecture is that it does not provide configurability or expansion in a single processing area. For example, if an application requires triple the polygon processing of a single pipeline, but does not require additional pixel processing, the entire graphics pipeline cost is tripled.

To eliminate the inefficiencies associated with configuring traditional pipelined architectures, and to allow dynamic process reallocation, distribution buses are implemented in the present invention. This bus architecture allows all database, polygon, pixel, and video processors to feed data among themselves. This modularity provides optimum matching of polygon and pixel requirements among the diverse module, console, and training (battle scenario) requirements. Moreover, the polygon bus prevents excessive polygon processing demands from overloading a local set of processors.

When making use of the fixed interleave processing and broadcasting on the polygon distribution bus, a few or many pixel processors may be configured as required for a particular application. Crossbar interconnects are used across all polygon processors to provide additional load leveling. The crossbar allows for polygon process resource allocation across all processing nodes. In the case that one node is overloaded and another is underutilized, the extra required processing is provided by the underutilized node. This technique is used to level processing demands across all channels. This is very useful in distributed simulation environments, where if one channel is heavily loaded, others tend to be underutilized. The polygon process allocation completely addresses this irregular loading situation.

With the fixed interleave pixel processing and the pixel distribution bus of the present invention, one to many video channels may be fed from one to many pixel processors. As with other system components, video channels may be optimized for a particular application without incurring additional system overhead.

The architectural and performance benefits of the present image generator architecture are as follows. The tri-level fixed interleaving and distribution buses allow for maximum utilization of all processing resources of an image generator. With the present architecture, all processors stay busy, even when the processing load is highly irregular. For example, consider the polygon and pixel levels required for three viewing channels of a battlefield environment. The center channel may look at a dense village and bridge scene, with much higher processing requirements than the two adjacent channels.

With the fixed interleaving and distribution buses of the present invention, the image generator naturally processes the aggregate processing level of all channels with equal load on all processing elements. A traditional, fixed pipeline architecture must configure for the worst case channel. In this case, the traditional fixed pipeline architecture requires twice the number of processing elements to handle the potential worse case condition in any channel. In the present fixed interleaved architecture with distribution buses, processing for the aggregate loading of the three channels is required.

Another benefit of the present distributed processing architecture is its implicit modularity. This allows an image generator to be effectively configured for all applications independent of polygon-to-pixel to channel processing requirements. Polygon, pixel and channel resources may be independently added to the image generator to exactly match application requirements for a specified image generator application. Fixed pipeline architectures force a specific polygon-to-pixel processing ratio, and expansion in any area must accept the associated overhead of the other boards in the pipeline.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
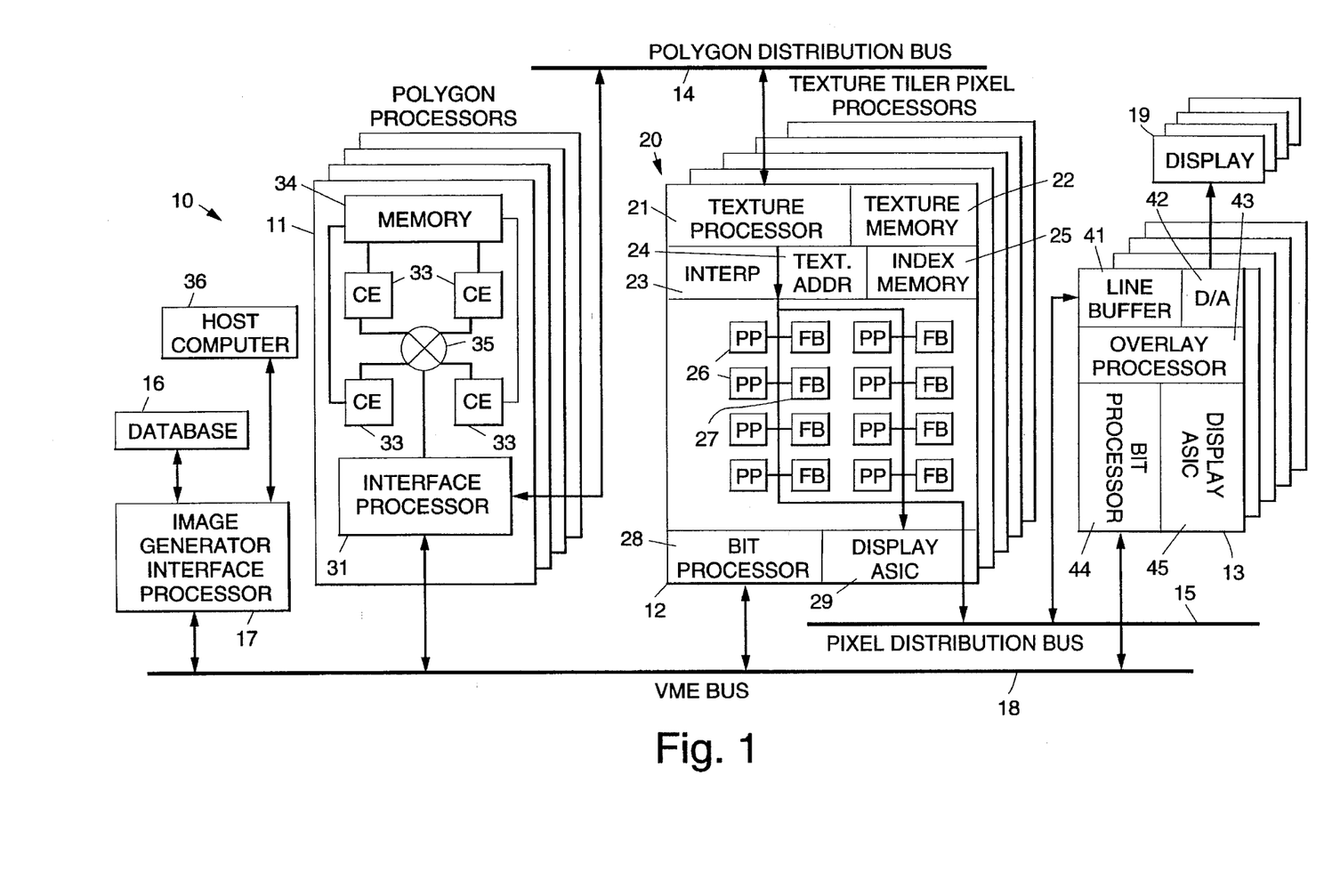
FIG. 1 illustrates an image generator architecture in accordance with the present invention that employs tri-level fixed interleave processing and distribution buses.

Referring to the drawing figures, FIG. 1 illustrates an image generator architecture 10 in accordance with the present invention that employs tri-level fixed interleave processing and a plurality of distribution buses. The image generator architecture 10 is comprised of a polygon processor 11, a texture tiler pixel processor 12, a video generator 13, a database 16, and an image generator interface processor 17. The image generator interface processor 17 also responds to commands and queries from a host computer 36. The video generator 13 is coupled to one or more video displays 19. The image generator architecture 10 includes three buses, namely a polygon distribution bus 14, a pixel distribution bus 15 and a VME or control bus 18.

The polygon processor 11 may include a plurality of interconnected PC cards that each include one or four computational elements (CE) 33 interconnected by way of a crossbar switch 35. Each of the computational elements 33 are coupled to a memory 34 and the computational elements 33 are coupled to an interface processor 31. The interface processor 31 is employed to communicate with other processors of the architecture 10 by way of the VME and polygon distribution busses 18, 14.

The image generator interface processor 17, polygon processor 11, texture tiler pixel processor 12, and video generator 13 are coupled to the VME bus 18. The interface processor 31 in the polygon processor 11 is coupled to the polygon distribution bus 14 along with the texture tiler pixel processor 12. The texture tiler pixel processor 12 and the video generator 13 are coupled to the polygon distribution bus 14. The texture tiler pixel processor 12 and the video generator 13 are also coupled to the pixel distribution bus 15.

The texture tiler pixel processor 12 comprises a texture processor 21 that is coupled to a texture memory 22, a bilinear interpolator 23, a texture address generator 24, an index memory 25, a plurality of pixel processors (PP) 26 interconnected to a plurality of frame buffer (FB) or memory 27, a bit processor 28 and a display application specific integrated circuit (ASIC) 29. The bit processor is coupled to the VME bus 18. The digital to analog converter 42 is coupled to the display 19.

The video generator 13 is comprised of a line buffer 41, a digital to analog (D/A) converter 42, an overlay processor 43, a bit processor 44, and a display application specific integrated circuit (ASIC) 45. The line buffer is coupled to the pixel distribution bus 15 and the bit processor is coupled to the VME bus 18.

Figure 1A:
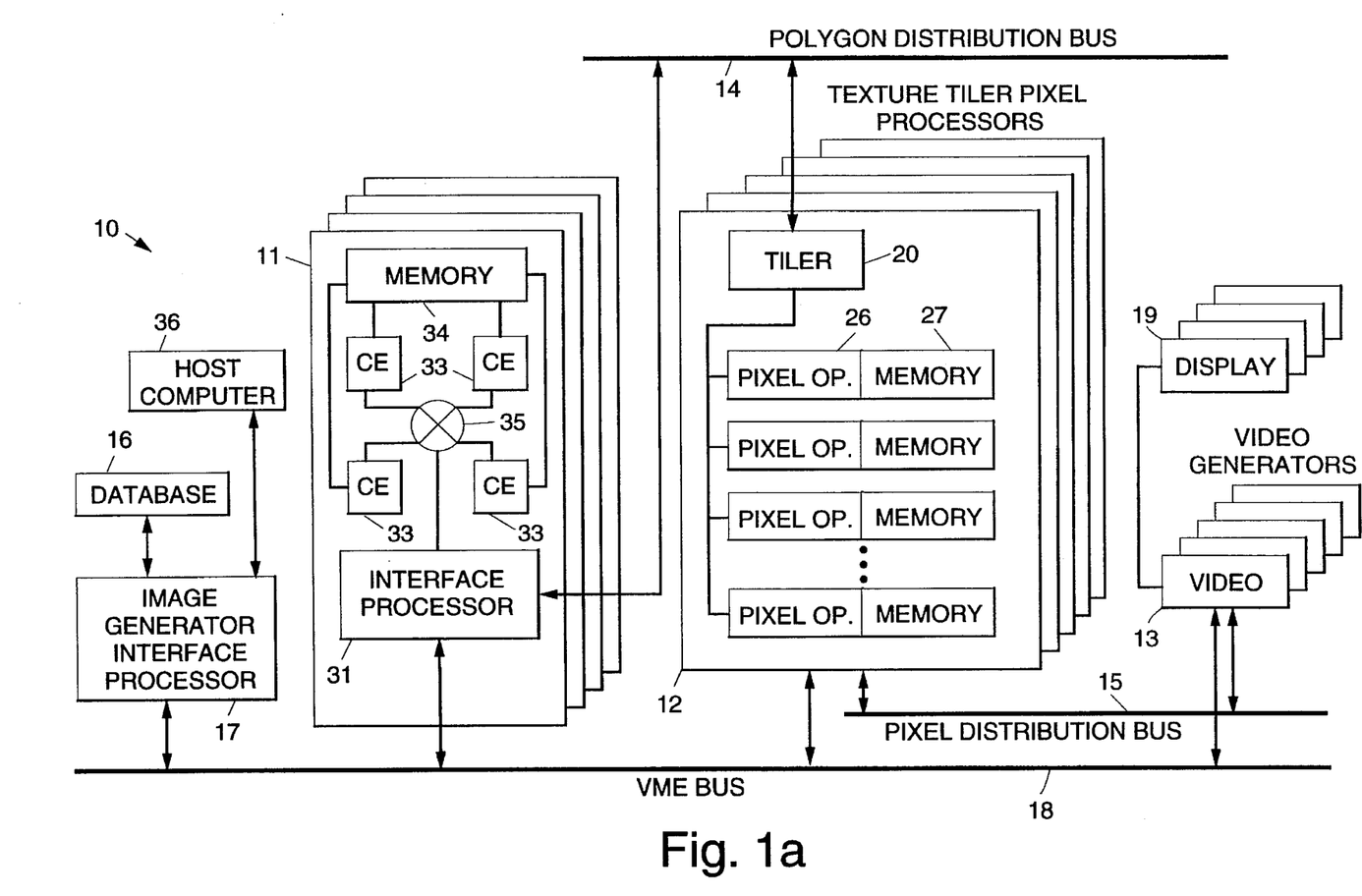
FIG. 1a illustrates a representation of the image generator architecture of FIG. 1 that is useful in describing the improvements of the present invention.

Referring to FIG. 1a, it illustrates a representation of the image generator architecture 10 of FIG. 1 that is useful in describing the improvements of the present invention. The image generator architecture 10 shown in FIG. 1a includes the polygon processor 11 as described above, but the texture tiler pixel processor 12, and video generator 13 are shown in a manner that better illustrates the present invention. The texture tiler pixel processor 12 is shown comprising a tiler 20 that is coupled to multiple pixel processors 26 and memories 27.

As is shown in FIG. 1a, the polygon processor 11 processes polygons transferred to it from the database 16 by way of the image generator interface processor 17. The computational elements 33 process the polygons and the interface processor 31 transfers the processed polygons to the texture tiler pixel processor 12 by way of the polygon distribution bus 14. The transferred polygons are processed by the tiler 20 and pixel processors 26 and the processed pixels are transferred by way of the pixel distribution bus 15 to the video generator 13 which processes the pixels for viewing on the display 19.

Figure 1B:
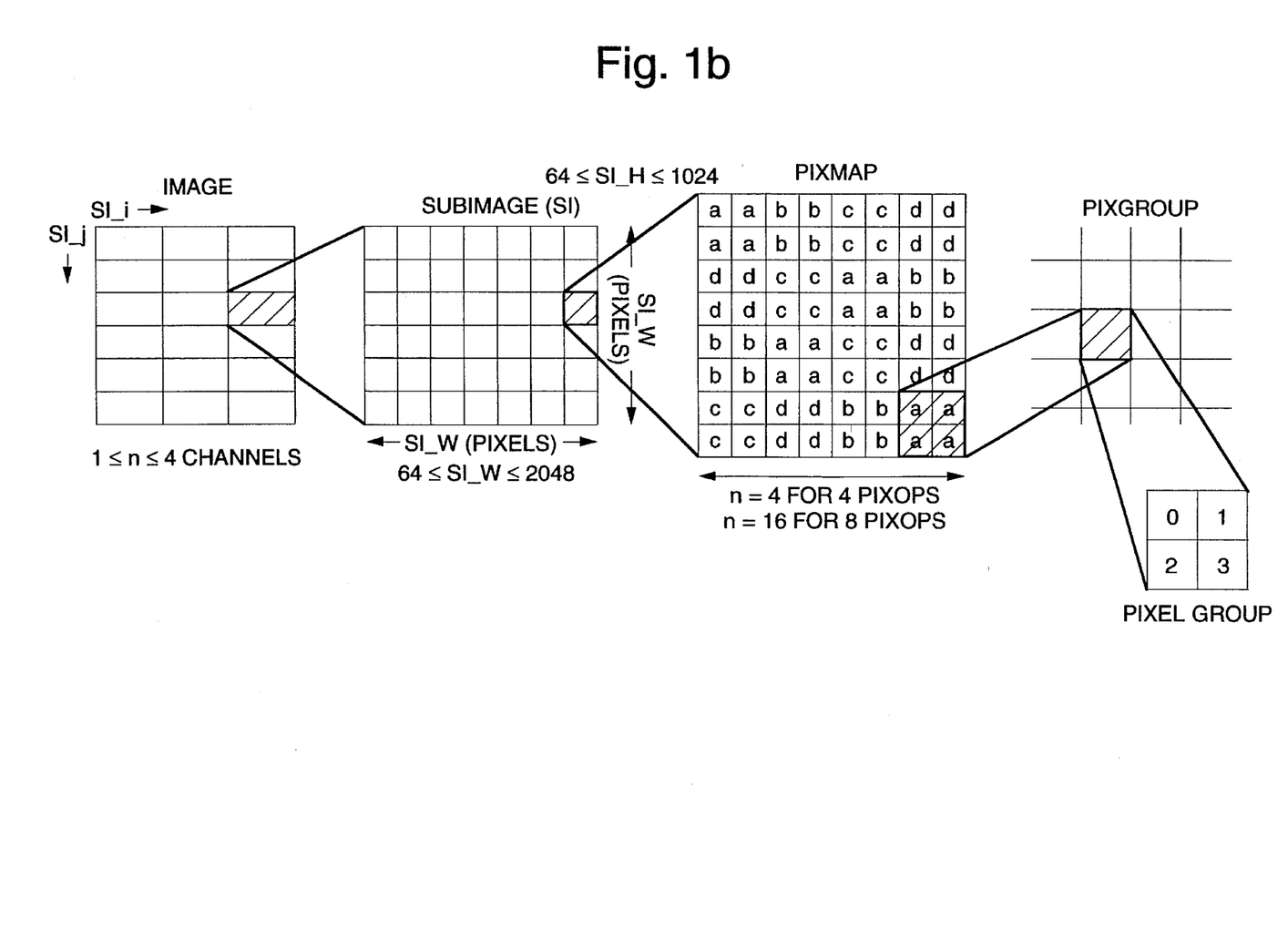
FIG. 1b illustrates the multiple levels of processing performed in the distributed processing architecture of FIG. 1.

To better understand the processing performed by the present invention, reference is made to FIG. 1 b illustrates the multiple levels of processing performed in the distributed processing architecture 10 of FIG. 1. A 1024 by 1024 pixel image is partitioned into a plurality of subimages that are 128 by 128 pixels. Each of the subimages is assigned to a particular tiler 20 for processing. Each subimage is partitioned into a plurality of pixmaps (four or eight) depending upon the number of pixel processors 26 or pixops 26 (4 or 8) that are employed in the texture tiler pixel processor 12. Each pixmap is partitioned into a plurality of pixel groups (pixgroups) comprising two-by-two sets of pixels. The pixel groups are processed by the pixops 26.

The mapping or encoding of subimages to tilers 20, and pixmaps and pixgroups to pixel processors 26 is implemented by a straightforward pixel mapping scheme. A typical example for encoding a subimage is given below. The subimage number, pixel address (i,j) and channel number are input into a tiler 20. The tiler 20 performs a a function to determine the mapping of pixels to the pixel operators 26. This is given by:

$$\text{pixop \#} = f(\text{subimage \#}, i, j, \text{channel \#})$$

The following function maps pixgroups to pixel operators as designated by the pixmap shown in FIG. 1b.

$$\begin{aligned}
&\text{DO tiling} \\
&i = i \mathrel{\&} ((2^{\wedge}ibits[channel]) - 1) \\
&j = j \mathrel{\&} ((2^{\wedge}jbits[channel]) - 1)
\end{aligned}$$

-continued $$sji = (\text{subimage\#} << (j\text{bits[channel]} + i\text{bits[channel]}))$$

$$(j << i\text{bits[channel]})|i$$

The output of the tiling operation are sji and channel number which are applied to the appropriate pixop 26. The pixop 26 performs a pixop procedure as follows:

subimage# = $sij >> (j\text{bits[channel]} + i\text{bits[channel]})$ $j = (sji >> i\text{bits[channel]}) \& ((2\hat{\,}j\text{bits[channel]}) - 1);$ and $i = sji \& ((2\hat{\,}i\text{bits}) - 1)$ Thereafter, pixel operations are performed on each pixgroup. The programming of these operations and the moving of data between computer memories is considered routine in the art. Consequently, those skilled in the art are readily capable of programming the required processing operations necessary to implement the present invention.

Figure 2:
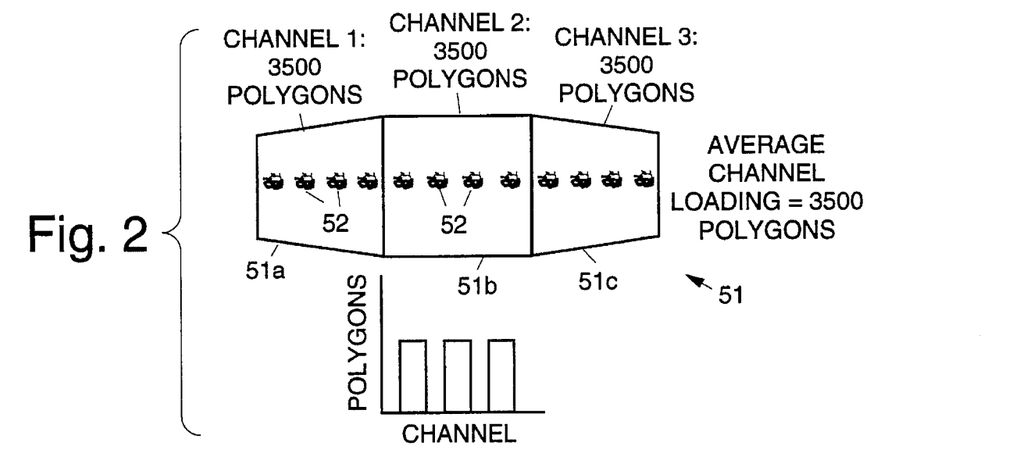
FIGS. 2 and 3 illustrates a dynamic simulated battlefield environment that causes uneven distribution of polygons to processing channels.
Figure 3:
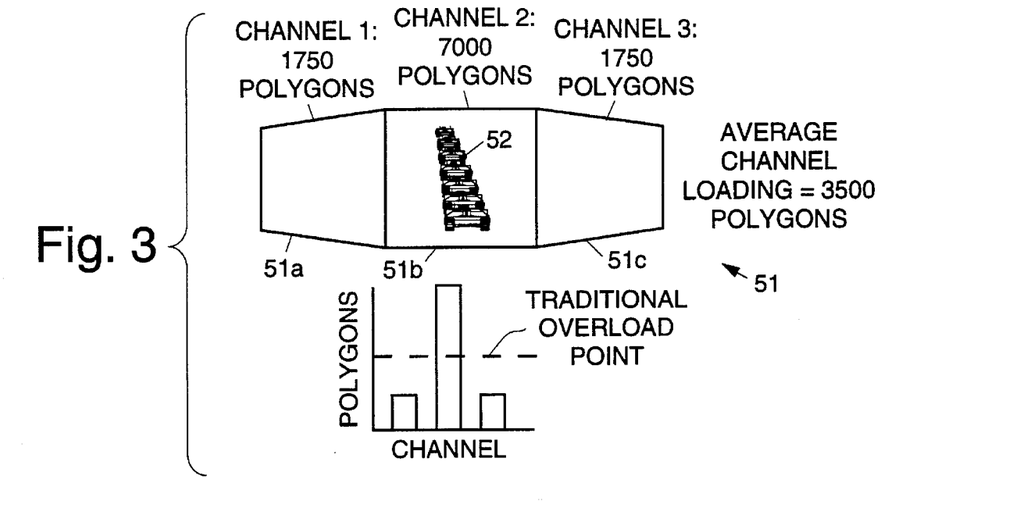

FIGS. 2 and 3 illustrates a dynamic simulated battlefield environment that causes uneven distribution of polygons to processing channels 51a–51c of the image generator architecture 10. The simulated environment of FIG. 2 shows a line of tanks 52 spread across three channels 51a–51c. Each of the three channels 51a–51c have 3500 polygons contained therein that make up an image scene. The average loading of the channels 51a–51c is therefore 3500 polygons per channel. The simulated environment of FIG. 3 shows the line of tanks 52 extending into the distance relative to a viewer, and all tanks 52 are located in one channel 51b. There are 1750 polygons in the first and third channels 51a, 51c while the second channel 51b has 7000 polygons. The average loading in the channels 51a–51c is 3500 polygons per channel. However, FIG. 3 shows that the traditional overload threshold is exceeded in the second channel 51 b.

The present invention provides for an image generator architecture 10 that includes tri-level fixed interleave processing and a plurality of distribution busses 14, 15, 18. The value in these two aspects is in their combined application to image generation. Tri-level fixed interleave processing aspect of the present architecture 10 levels the loading across all database, polygon, and pixel (video) processors that respectively comprise the image generator interface processor 17, polygon processor 12, and video generator 13.

In networked training systems, for example, visual system processing requirements are such that millions of polygons and hundreds of millions of pixels are processed every second. This enormous processing load requires many resources working in parallel on polygon and pixel calculations using the image generator interface processor 17, polygon processor 12, and video generator 13. The challenge in this graphics environment is to provide a technique that levels the loading of many parallel processing resources. Without load leveling, each resource must be designed to handle the worst case, driving system costs excessively high.

Figure 4:
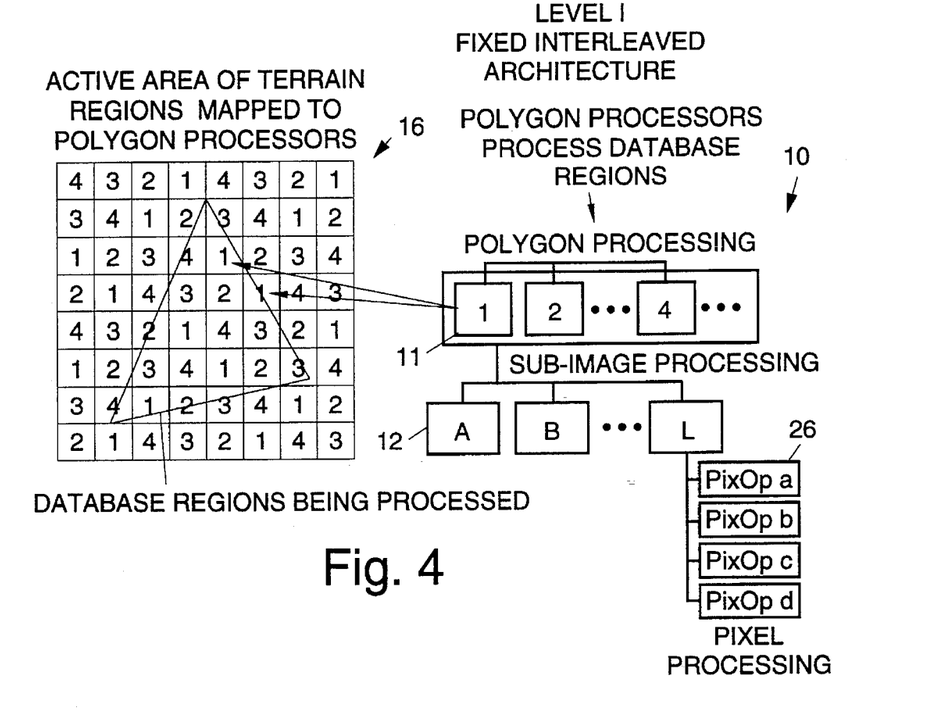
FIG. 4 illustrates how interleaved database regions are distributed to polygon processors in the image generator architecture of FIG. 1 to provide for implicit load leveling.

The fixed interleave processing implemented in the image generator architecture 10 divides a processing task into a pseudo-random, fixed interleaved pattern of regions that are assigned to the different polygon processors 12. Each polygon processor 12 processes many of these randomly located regions. The assignment of polygon processors 12 to regions is a fixed repeating pattern as shown in FIG. 4.

The highest level of fixed interleave processing is the allocation of fixed-size database regions (area modules) to polygon processors 12. This solves two problems. The first is parsing out of polygon processing to parallel polygon processors 12, and the second is allowing a specific database region to be processed in a single polygon processor 12, even when required across multiple channels. This alleviates the need for additional memory and processing resources when a region must be processed for multiple channels 51a–51c.

Figure 5:
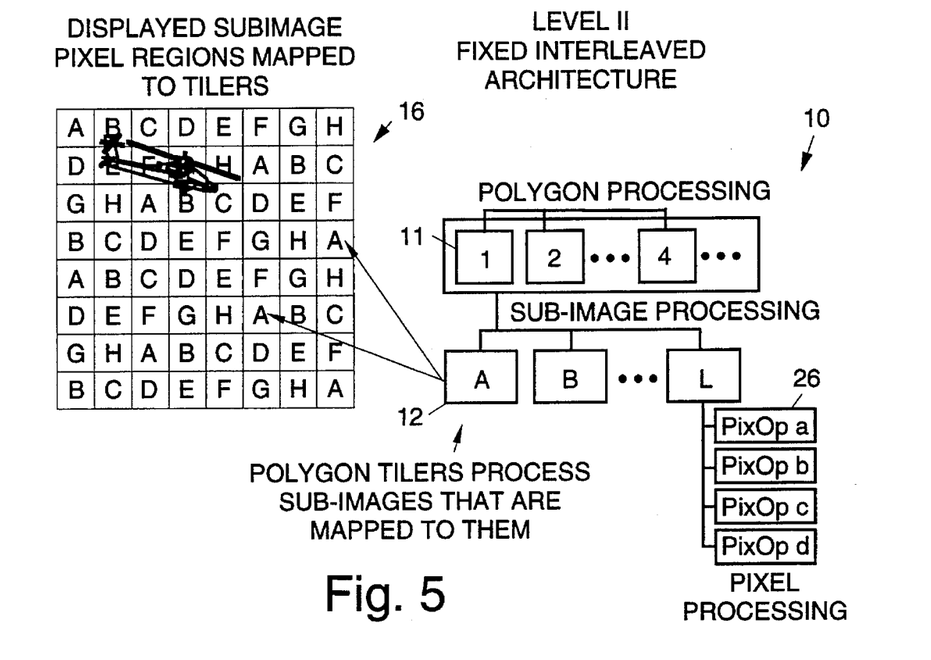
FIG. 5 illustrates fixed interleave image sub-region mapping to tilers in the image generator architecture of FIG. 1 that ensures implicit pixel load leveling.

The next level relates to image sub-region fixed interleave processing. FIG. 5 illustrates fixed interleave image sub-region mapping to tilers 20 in the image generator architecture 10 of the present invention that ensures implicit pixel load leveling. At this level, the displayed image is divided into small sub-regions that are assigned to tilers 20 in a pseudo-random, but fixed manner. This levels the load across all pixel processors 26. Typically, tilers process a large contiguous area of the image. This technique suffers an overload when all processing fall into a region of the image processed by one pixel processor 26. The present invention solves this problem by using small subregions (commonly 64×64 pixels) and assigning many sub-regions from different channels 51 to a single tiler 20. Each tiler 20 maintains equal loading even with localized regions of high pixel processing.

Figure 6:
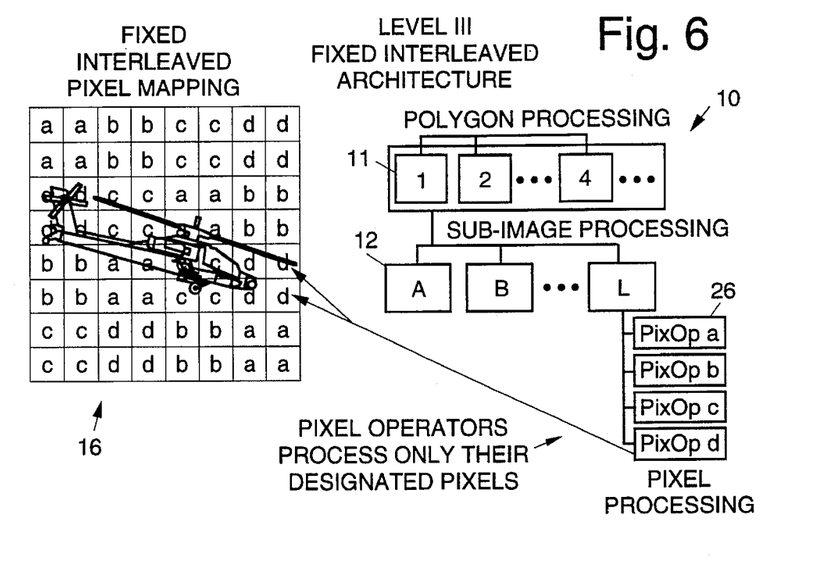
FIG. 6 illustrates fixed interleaved 2×2 pixel mapping to pixel operators in the image generator architecture of FIG. 1 that ensures implicit load leveling.

The third level relates to two-by-two pixel, fixed interleave processing. FIG. 6 illustrates fixed interleaved 2×2 pixel mapping to pixel operators 26 in the image generator architecture 10 of the present invention that ensures implicit load leveling. The third level of fixed interleaving is at the lowest pixel processing level in the architecture 10. The image is further divided into 2×2 pixel blocks spread across multiple pixel operators 26 in a tiler 20. This fine grain parallelism, in a fixed pseudo-random orientation, ensures equal loading across all pixel processors 26.

The tri-level fixed interleaved processing implemented in the present architecture 10 thus equalizes loading across all processors 11, 12, 13 under all conditions, providing consistent maximum system performance required for the multi-channel training in complex battlefield environments.

The second aspect of the present invention is the use of the polygon and pixel distribution buses 14, 15. Maximum image generator configurability, expansion, and efficient processing is required for a variety of simulator configurations used in networked training environments. To accomplish this, the polygon and pixel distribution buses 14, 15 are provided between all graphics processing stages.

A variety of polygon and pixel processing capacities are necessary for channels 51 of each simulation system. In some cases, high pixel processing capacities are required for high resolution views. In other cases, high polygon processing capacities are required for wide fields of view. In some cases, polygon processing demands changes dynamically from frame to frame across several channels 51. These variations in processing allocation and dynamic processing requirements are addressed by the present architecture 10.

Most conventional graphics systems have rigid pipelined architectures. The database engine feeds the polygon processor, which feeds the pixel processor and finally the video processor. The entire graphics pipeline is then duplicated, as required, to provide the required number of processing levels. The major drawback in this conventional architecture is that it does not provide configurability or expansion in a single processing area. For example, if an application requires triple the polygon processing of a single pipeline, but does not require additional pixel processing, the entire graphics pipeline cost is tripled.

To eliminate the inefficiencies associated with configuring traditional pipelined architectures, and to allow dynamic process reallocation, the distribution buses 14, 15 are implemented in the present invention. This bus architecture allows all database (image generator interface processor 17), polygon, pixel, and video processors 12, 26, 13 to feed data among themselves. This modularity provides optimum matching of polygon and pixel requirements among the diverse module, console, and training (battle scenario) requirements. Moreover, the polygon bus 14 prevents excessive polygon processing demands from overloading a local set of polygon processors 12.

FIG. 1a illustrates polygon and pixel distribution buses 14, 15 in accordance with the present invention that allows for modular expansion of required resource polygons, pixels, or channels in the present image generator architecture 10. When making use of the fixed interleave processing and broadcasting on the polygon distribution bus 14, a few or many tilers 20 and associated pixel processors 26 may be configured as required for a particular application. Crossbar switches 35 are used across all polygon processors 12 to provide additional load leveling. The crossbar switch 35 allows for polygon process resource allocation across all processing nodes. In the case that one node is overloaded and another is underutilized, the extra required processing is provided by the underutilized node. This technique is used to level processing demands across all channels 51. This is very useful in distributed simulation environments, where if one channel 51 is heavily loaded, other channels 51 end to be underutilized. The polygon processor 12 allocation completely addresses this irregular loading situation.

With the fixed interleave pixel processing and the pixel distribution bus 15 of the present invention, one to many video channels may be fed from one to many pixel processors 26. As with other system components, video channels may be optimized for a particular application without incurring additional system overhead.

Figure 7:
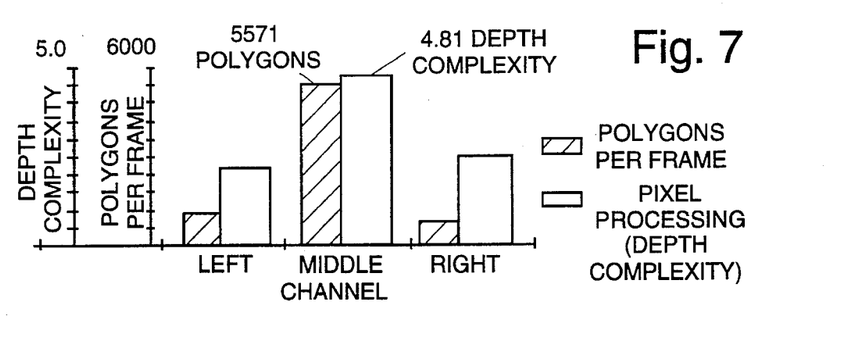
FIG. 7 illustrates a polygon and pixel processing loading distribution representative of a three-channel image generator configuration.

The architectural and performance benefits of the image generator architecture 10 are as follows. The tri-level fixed interleaving and distribution buses 14, 15 allow for maximum utilization of all processing resources of an image generator. With the present architecture 10, all processors stay busy, even when the processing load is highly irregular. For example, consider the polygon and pixel levels required for three viewing channels 51a–51c of a battlefield environment. FIG. 7 illustrates a polygon and pixel processing loading distribution representative of a three-channel image generator configuration. The center channel 51 may look at a dense village and bridge scene, with much higher processing requirements than the two adjacent channels 51.

Figure 8:
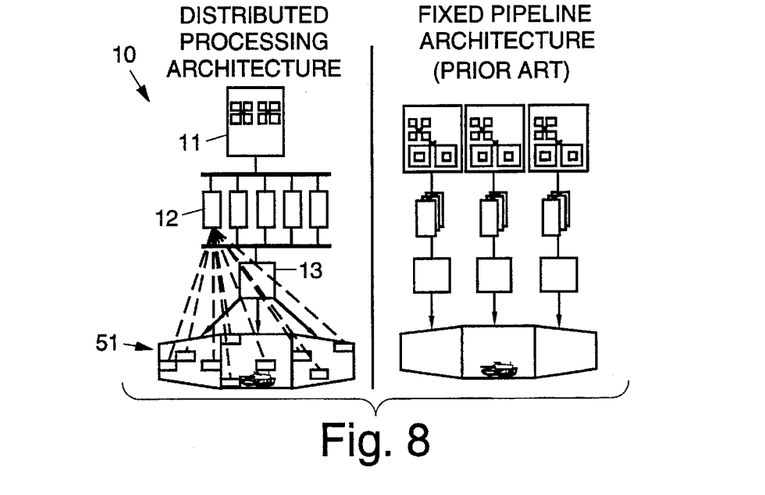
FIG. 8 compares processing requirements for the present distributed processing architecture compared to a conventional architecture for the three-channel image generator configuration of FIG. 7.

FIG. 8 compares processing requirements for the present distributed processing architecture 10 compared to a conventional architecture for the three-channel image generator configuration of FIG. 7. With the fixed interleaving and distribution buses 14, 15 of the present invention, the image generator architecture 10 naturally processes the aggregate processing level of all channels 51 with equal load on all processors 11, 12, 13. A traditional, fixed pipeline architecture must configure for the worst case channel. In this case, the traditional fixed pipeline architecture requires twice the number of processing elements to handle the potential worse case condition in any channel. In the present fixed interleaved processing architecture using polygon and pixel distribution buses 14, 15, processing for the aggregate loading of the three channels 51a–51c is required. The present distributed processing architecture 10 requires only 14 boards compared to 30 for the fixed pipeline architecture. These numbers correlate to the data presented in FIG. 7.

Another benefit of the present distributed processing architecture 10 is its implicit modularity. This allows an image generator 13 to be effectively configured for all applications independent of polygon-to-pixel to channel processing requirements. Polygon, pixel and channel resources may be independently added to the image generator architecture 10 to exactly match application requirements for a specified image generator application. Fixed pipeline architectures force a specific polygon-to-pixel processing ratio, and expansion in any area must accept the associated overhead of the other boards in the pipeline.

Thus there has been described a new and improved image generator architecture employing tri-level fixed interleave processing and distribution buses for use in image generation. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An image generator architecture for generating a simulated image, said architecture comprising:

an image database;

a control bus;

a polygon distribution bus;

a pixel distribution bus;

an interface processor coupled to the control bus and to the image database for reading image data from the database;

a plurality of parallel polygon processors coupled to the control and polygon distribution busses for receiving data from the image database by way of the interface processor and coupled to the polygon distribution bus;

a plurality of texture filer pixel processors coupled between the polygon distribution bus and the pixel distribution bus that each comprise a tiler coupled to a plurality of parallel pixel processors; and a plurality of parallel video processors coupled to the plurality of texture tiler pixel processors by way of the pixel distribution bus and coupled to the plurality of polygon processors and interface processor by way of the control bus.

2. The image generator architecture of claim 1 wherein each polygon processor processes one region of a plurality pseudo-random, fixed interleaved pattern of randomly located regions of the image that have a fixed repeating pattern to minimize correlation of local scene complexity with any one processor.

3. The image generator architecture of claim 1 wherein each tiler processes pseudo-random fixed interleaved subregions of the image to level the processing load across all pixel processors coupled thereto.

4. The image generator architecture of claim 1 wherein the plurality of parallel pixel processors each pseudo-randomly process two-by-two pixel blocks of the image to provide for equal loading across all pixel processors.

* * * * *